United States Patent
Price

(10) Patent No.: US 12,234,726 B1
(45) Date of Patent: Feb. 25, 2025

(54) CYLINDRICAL ICE AUGER BIT FOR FASTER AND EASIER HOLE DRILLING

(71) Applicant: Brandon Price, Concho, AZ (US)

(72) Inventor: Brandon Price, Concho, AZ (US)

( * ) Notice: Subject to any disclaimer, the term of this patent is extended or adjusted under 35 U.S.C. 154(b) by 0 days.

(21) Appl. No.: 18/750,726

(22) Filed: Jun. 21, 2024

(51) Int. Cl.
  *E21B 7/00* (2006.01)
  *A01K 97/01* (2006.01)

(52) U.S. Cl.
  CPC .............. *E21B 7/008* (2013.01); *A01K 97/01* (2013.01)

(58) Field of Classification Search
  CPC ................................ E21B 7/008; A01K 97/01
  USPC .......................................................... 175/18
  See application file for complete search history.

(56) References Cited

U.S. PATENT DOCUMENTS

| | | | | |
|---|---|---|---|---|
| 1,857,585 | A * | 5/1932 | Brooks, Sr. ............ | A01K 97/01 175/18 |
| 2,723,835 | A * | 11/1955 | Reese ....................... | F25C 5/04 175/18 |
| 3,025,917 | A * | 3/1962 | Knoblauch ............. | E21B 17/22 175/18 |
| 5,873,419 | A | 2/1999 | Berry et al. | |
| 5,950,738 | A * | 9/1999 | Caswell ................ | B23B 51/102 175/18 |
| 6,626,250 | B1 | 9/2003 | Ham | |
| D635,599 | S | 4/2011 | Furseth et al. | |
| 8,646,547 | B1 | 2/2014 | Johnson et al. | |
| 9,249,631 | B2 * | 2/2016 | Pantzke .................. | E21B 25/00 |
| 2002/0129975 | A1 | 9/2002 | Barta | |
| 2002/0144572 | A1 * | 10/2002 | Chaves ................... | B25B 27/10 81/3.55 |
| 2004/0144572 | A1 * | 7/2004 | Hamilton ................ | E21B 10/02 175/385 |
| 2004/0240954 | A1 * | 12/2004 | Chilcott .................. | E21B 7/008 408/239 A |
| 2006/0254818 | A1 | 11/2006 | Pepple | |
| 2010/0074702 | A1 * | 3/2010 | Kluge ..................... | A01K 97/01 408/125 |
| 2016/0010393 | A1 | 1/2016 | Ivan, Sr. | |
| 2019/0039262 | A1 * | 2/2019 | Gamble ................. | B28D 1/041 |
| 2023/0182217 | A1 * | 6/2023 | Vasudeva ............ | B23B 51/0453 408/208 |

FOREIGN PATENT DOCUMENTS

| | | |
|---|---|---|
| CA | 1192899 A | 9/1985 |
| CN | 203732303 U * | 4/2014 |

* cited by examiner

*Primary Examiner* — Taras P Bemko

(74) *Attorney, Agent, or Firm* — Gugliotta & Gugliotta, LPA

(57) ABSTRACT

An ice auger for drilling holes in ice includes a cylindrical tubular bit with a cutting edge having a plurality of teeth on the bottom end, and a center shaft extending vertically through the tubular bit. The center shaft has a pointed tip extending below the teeth and a top end extending above the tubular bit for coupling to a rotary powerhead. The tubular bit may include tangential slots for drainage and ice removal. The pointed tip of the center shaft prevents lateral movement of the auger during initial cutting. The ice auger drills holes faster and easier than conventional augers by cutting a circular groove and removing only the perimeter ice. The ice auger is well-suited for ice fishing and livestock watering applications.

5 Claims, 3 Drawing Sheets

CYLINDRICAL ICE AUGER BIT FOR FASTER AND EASIER HOLE DRILLING

RELATED APPLICATIONS

There are no previously filed, nor currently any copending applications, anywhere in the world.

BACKGROUND OF THE INVENTION

1. Field of the Invention

The present invention relates generally to the field of ice drilling devices and, more particularly, to an improved ice auger bit design for faster, easier, and more efficient drilling of holes in ice for ice fishing and livestock watering applications.

2. Description of the Related Art

Ice fishing is a popular winter activity enjoyed by many outdoor enthusiasts. It involves drilling through the ice on a frozen body of water to access the fish below. In addition to recreational fishing, holes may also need to be drilled in the ice covering livestock troughs to provide drinking water for animals. Conventionally, holes are drilled using auger-style bits which have a helical screw blade wrapped around a central shaft, resembling a large corkscrew.

While widely used, conventional ice augers suffer from several drawbacks. The spiral blade must grind and chisel through the entire volume of ice within the diameter of the hole, which can be a slow and laborious process. The significant amount of ice shavings generated must also be cleared from the hole. Moreover, the twisting motion of the auger combined with the resistance of the ice can make the auger difficult to control and stabilize, especially during initial engagement with the ice surface.

These challenges are exacerbated by the increasing popularity of ice fishing and the need to drill numerous holes in a short time frame. The difficulty and time required to drill each hole can limit the number of holes an angler can realistically drill in a day, potentially impacting their success and enjoyment of the sport. For livestock operations, the time and effort required to drill through thick ice can be a significant burden and may limit access to water for the animals.

Therefore, there is a need for an improved ice drilling device that can create holes more quickly, easily, and efficiently compared to conventional augers. The device should require minimal effort from the user while providing a clean, debris-free hole. It should also be stable during use and easily adaptable to different hole sizes and ice thicknesses. By addressing these needs, such a device would enhance the ice fishing experience for anglers and improve winter livestock watering operations for farmers and ranchers.

SUMMARY OF THE INVENTION

It is thus an object of the present invention to provide an improved ice auger that drills holes more quickly, easily, and efficiently by employing a cylindrical hole saw design with a stabilizing center shaft, thereby addressing the challenges associated with conventional augers.

The main feature of the invention is a cylindrical tubular bit with teeth on the bottom edge that cuts a circular groove in the ice, enabling faster and easier hole drilling by only removing the perimeter ice.

The present invention provides an ice auger for drilling holes in ice includes a cylindrical tubular bit with a cutting edge having a plurality of teeth on the bottom end, and a center shaft extending vertically through the tubular bit. The center shaft has a pointed tip extending below the teeth and a top end extending above the tubular bit for coupling to a rotary powerhead. The tubular bit may include tangential slots for drainage and ice removal. The pointed tip of the center shaft prevents lateral movement of the auger during initial cutting. The ice auger drills holes faster and easier than conventional augers by cutting a circular groove and removing only the perimeter ice.

It is an advantage of the present invention that it drills holes in ice more quickly by only cutting the perimeter ice, rather than grinding through the entire volume of ice within the hole.

It is another advantage of the present invention that it requires less effort from the user compared to conventional augers, as the cylindrical design removes less ice material.

It is an advantage of the present invention that it provides easier control and stability during drilling, especially during initial engagement with the ice surface, due to the stabilizing center shaft with a pointed tip extending below the cutting teeth.

It is another advantage of the present invention that it produces minimal waste and debris in the form of ice shavings, resulting in a cleaner hole and less cleanup required.

It is an advantage of the present invention that it can be easily adapted to drill holes of various diameters and depths, making it suitable for different ice fishing and livestock watering applications.

It is another advantage of the present invention that it is constructed of durable materials, such as alloy steel, ensuring a long service life and reliable performance in harsh winter conditions.

It is an advantage of the present invention that it can be easily coupled to existing auger powerheads, allowing users to utilize their current equipment with the improved cylindrical hole saw bit design.

It is another advantage of the present invention that it enhances the overall ice fishing experience by allowing anglers to drill more holes in less time and with less effort, potentially increasing their success and enjoyment of the sport.

Further features of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
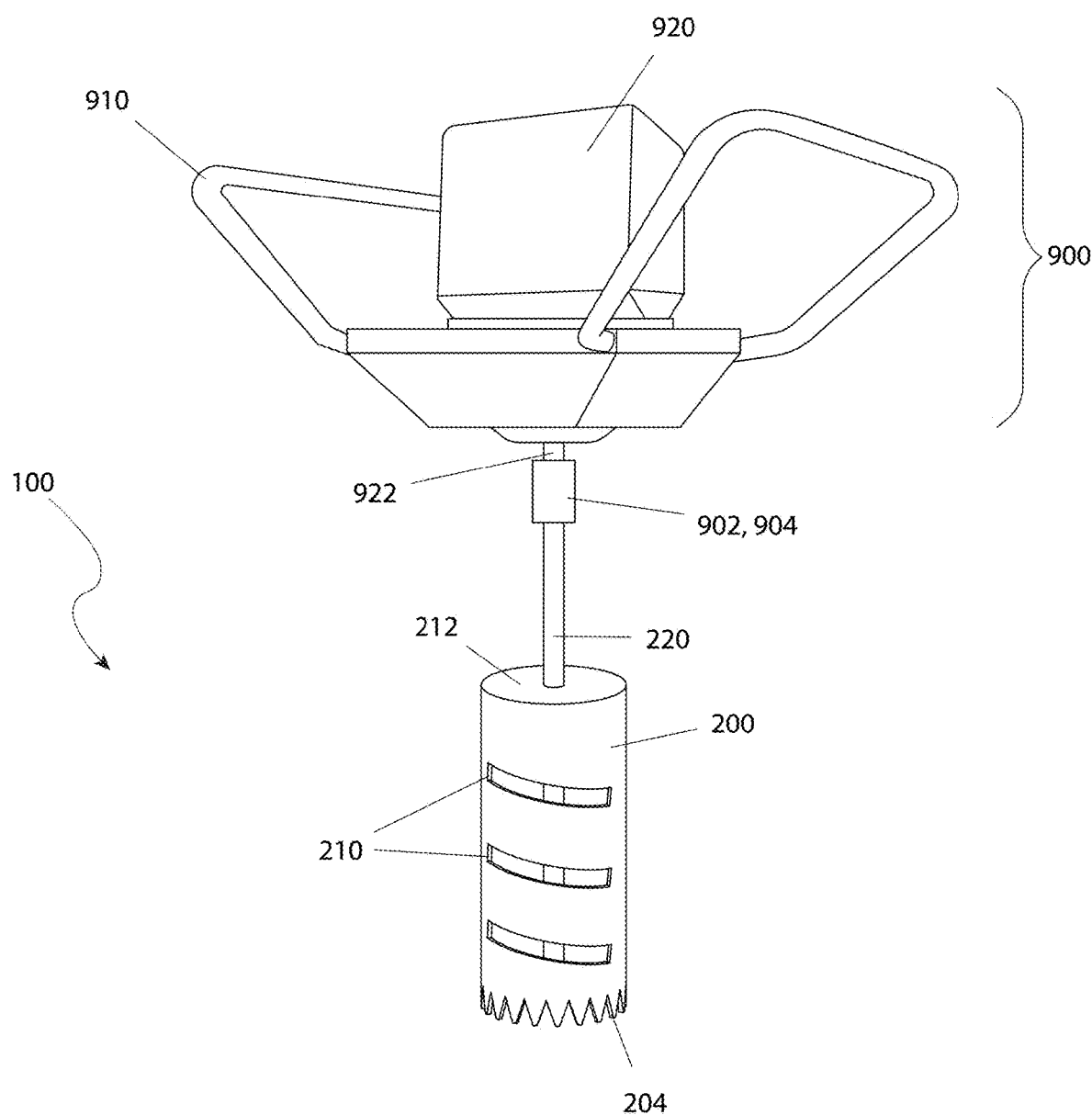
FIG. 1 is an in-use view of an ice auger 100, according to an embodiment of the present invention, illustrating the polar bore ice auger 100 coupled to an auger powerhead 900; and, FIG. 2 is a top isometric view of an ice auger 100, according to an embodiment of the present invention; and, FIG. 2a is a detail view of an ice auger 100, according to an embodiment of the present invention, illustrating a hex end 226 on the top of the center shaft 220; and, FIG. 2b is a detail view of an ice auger 100, according to an embodiment of the present invention, illustrating a coupling aperture 228 at the top of the center shaft 220; and, FIG. 3 is a bottom isometric view of an ice auger 100, according to an embodiment of the present invention.
Figure 2:
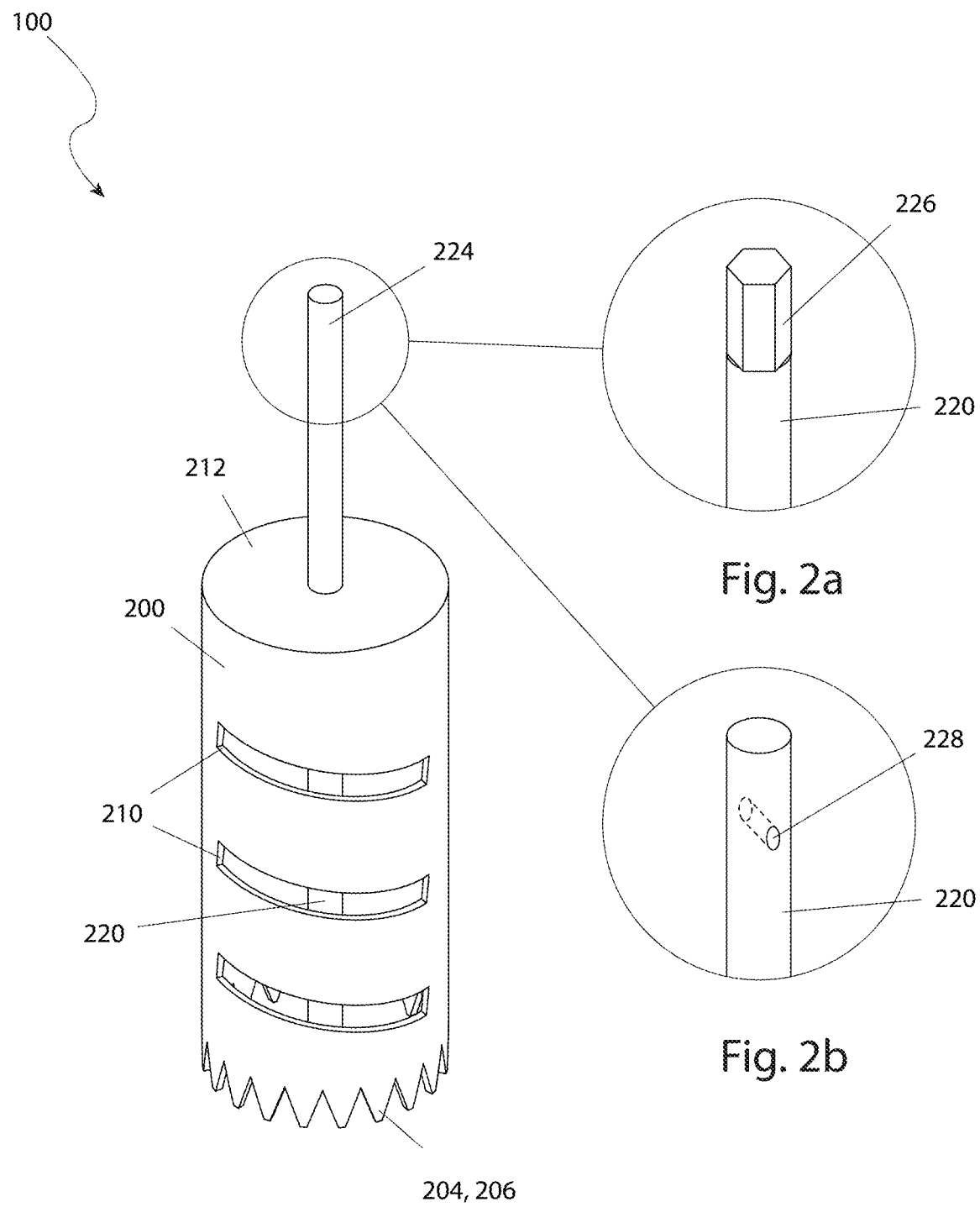
Figure 3:
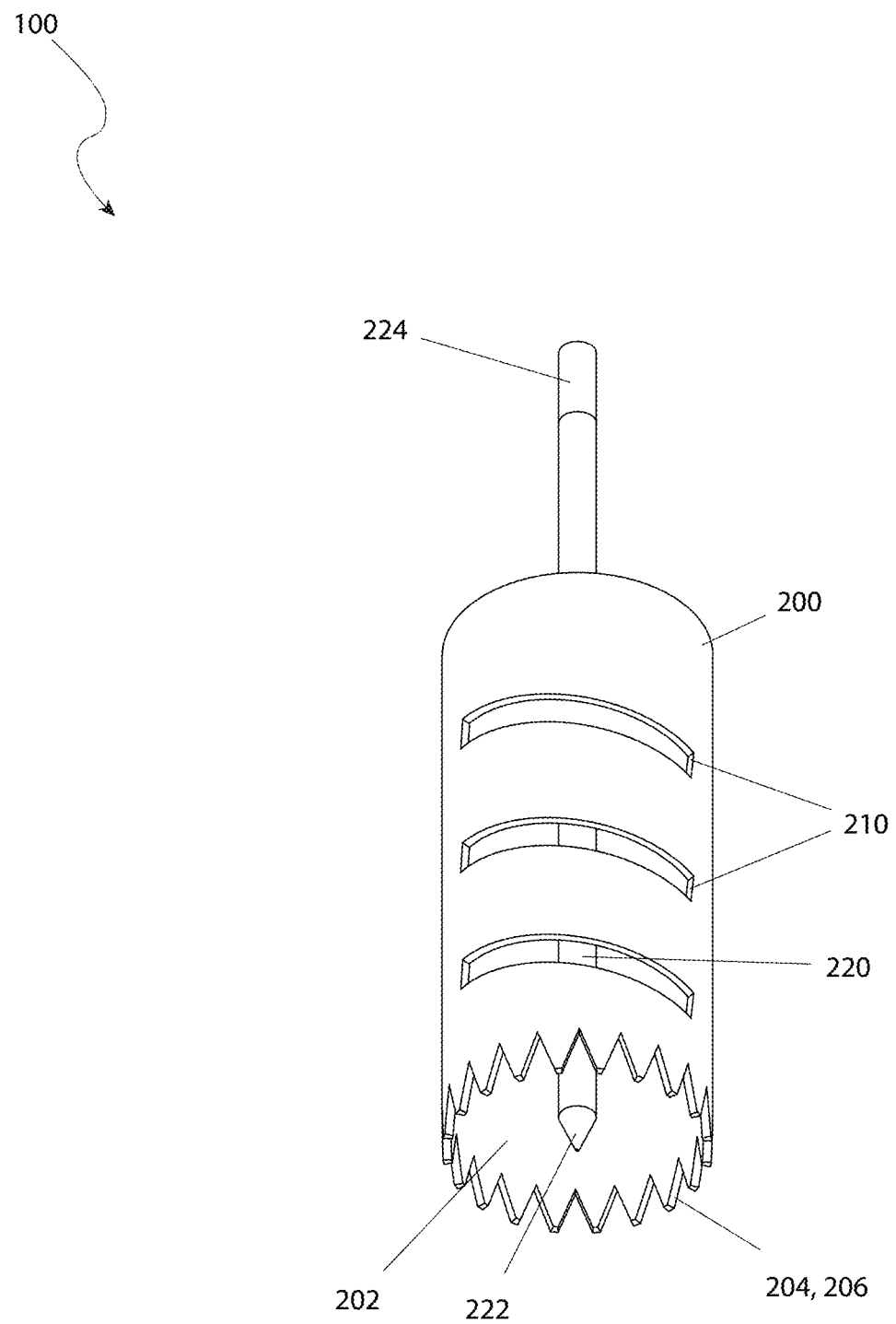

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Referring now to the drawings, wherein like reference numerals indicate the same parts throughout the several views, the present invention is directed to an ice auger (herein described as the "invention") 100. The invention 100 may comprise a tubular bit 200 and a center shaft 220. The invention 100 may be a cylindrical auger for boring an ice hole in ice. The invention 100 may be configured to couple to an auger powerhead 900 which may rotate the tubular bit 200. The invention 100 may be adapted to reduce boring time and to provide easier handling for a user by cutting the ice with a plurality of teeth 206 located on the bottom of the tubular bit 200. The center shaft 220 may prevent the invention 100 from sliding laterally prior to the plurality of teeth 206 engaging the ice.

The tubular bit 200 may be a hollow cylinder comprising an open bottom 202. The bottom edge of the tubular bit 200 may be a cutting edge 204 comprising the plurality of teeth 206. The tubular bit 200 may be positioned such that the longitudinal axis of the tubular bit 200 is vertically oriented and the plurality of teeth 206 are in contact with the ice. Rotation of the tubular bit 200 may cut a circular groove into the ice. The circular groove may deepen as rotation of the tubular bit 200 continues until the ice inside the tubular bit 200 breaks free of the ice outside of the tubular bit 200, forming an ice puck inside the tubular bit 200. The tubular bit 200 may then be removed from the ice leaving the ice hole and the ice puck may be removed from within the tubular bit 200. The top of the tubular bit 200 may comprise a top cap 212 that may couple the tubular bit 200 to the center shaft 220.

The tubular bit 200 may comprise a plurality of slots 210 that may be located on the side wall of the tubular bit 200. The plurality of slots 210 may extend tangentially along the tubular bit 200. The plurality of slots 210 may extend through the side wall of the tubular bit 200 from interior to exterior. The plurality of slots 210 may provide a drainage path for water and ice shavings and/or the plurality of slots 210 may be used to remove the ice puck from within the tubular bit 200. In some embodiments, a first end of an individual slot 210 selected from the plurality of slots 210 may be higher than the opposite second end of the individual slot 210.

The center shaft 220 may extend vertically and may be aligned with the longitudinal axis of the tubular bit 200. The top of the center shaft 220 may extend above the top cap 212 and may be configured to detachably couple to the auger powerhead 900.

The bottom of the center shaft 220 may extend downwards inside of the tubular bit 200 to a tip 222. The tip 222 may extend lower than the plurality of teeth 206 such that the tip 222 may prevent the invention 100 from moving laterally until the plurality of teeth 206 cut into the ice. In a preferred embodiment, the tip 222 may be two inches with an error of one inch (2.0+/−1.0 in.) lower than the bottom of the plurality of teeth 206. In some embodiments, the tip 222 may be threaded to screw into the ice and to pull the center shaft 220 downwards. The top end of the center shaft 220 may comprise a shank 224 for coupling the center shaft 220 to a coupler 902 located on a motor 920 of the auger powerhead 900 As a non-limiting example, the shank 224 may comprise a hex end 226 that may detachably couple to a chuck 904 on a motor shaft 922. Alternatively, the shank 224 may comprise a coupling aperture 228 that may align with a corresponding aperture located on the motor shaft 922 such that a coupling pin may slide through both the motor shaft 922 and the shank 224 to couple the center shaft 220 to the auger powerhead 900.

As a non-limiting example, the center shaft 220 may extend upwards from the top cap 212 for a distance of five to twenty-four inches (5-24.0 in.)

The tubular bit 200 may be available in various sizes. In some embodiments, the tubular bit 200 may comprise a height of sixteen inches with an error of two inches (16.0+/−2.0 in.) and a diameter of six inches with an error of one inch (6.0+/−1.0 in.). In some embodiments, the tubular bit 200 may comprise a height of two inches with an error of one inch (2.0+/−1.0 in.) and a diameter of thirty-two inches with an error of two inches (32.0+/−2.0 in.).

2. Operation of the Preferred Embodiment

In use, the shank 224 may be detachably coupled to the motor shaft 922 of an auger powerhead 900 and positioned vertically above ice. The motor 920 of the auger powerhead 900 may be activated to rotate the center shaft 220 and the tubular bit 200. The tip 222 of the center shaft 220 may prevent the center shaft 220 from moving laterally across the ice. In some embodiments, a threaded tip may pull the center shaft 220 downwards to bring the plurality of teeth 206 on the tubular bit 200 into contact with the ice. The plurality of teeth 206 may cut a circular groove in the ice and the circular groove may deepen as the tubular bit 200 continues to rotate with the user pressing down on handles 910 of the auger powerhead 900. Eventually, the ice that is inside of the tubular bit 200 may separate from the ice that is outside of the tubular bit 200. At that time, the tubular bit 200 may be lifted from the ice pulling an ice puck out and leaving an ice hole. As non-limiting examples, the ice hole may be drilled on a lake for fishing purposes, or the ice hole may be drilled in the ice covering a livestock trough so that the livestock may drink.

The exact specifications, materials used, and method of use of the invention 100 may vary upon manufacturing. The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples, and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this patent application.

What is claimed is:

1. A method of drilling a hole in ice, comprising:
providing an ice auger comprising a cylindrical tubular bit having an open bottom end, a cutting edge with a plurality of teeth disposed on the bottom end, and a top end;
a center shaft extending vertically through the tubular bit, the center shaft having a pointed tip extending below the plurality of teeth and a top end extending above the top end of the tubular bit and means for coupling the top end of the center shaft to a rotary powerhead;
coupling the top end of the center shaft to the rotary powerhead;
positioning the ice auger vertically above the ice with the pointed tip of the center shaft in contact with the ice;
actuating the rotary powerhead to rotate the tubular bit and center shaft, causing the plurality of teeth to cut a circular groove into the ice; and
continuing to rotate the tubular bit until the ice within the tubular bit separates from the ice outside the tubular bit, forming an ice hole;
wherein the ice hole is drilled in ice covering a livestock trough.

2. The method of claim 1, further comprising removing the ice auger from the ice hole and removing an ice puck from within the tubular bit.

3. The method of claim 1, and wherein the ice auger further comprises a plurality of slots formed through a sidewall of the tubular bit, each slot having a first end and a second end and extending at an angle relative to a vertical axis of the tubular bit such that the first end is positioned higher than the second end, wherein each slot extends through the sidewall of the tubular bit from an interior to an exterior of the tubular bit to facilitate removal of ice shavings during drilling.

4. The method of drilling a hole in ice of claim 1, wherein said cylindrical outer sidewall has a diameter of between about 6" to about 12" and forming a bore length of about 24".

5. The method of drilling a hole in ice of claim 1, wherein said center shaft has a length such that an overall length of the bit, including the main shaft, is about 38".

* * * * *